United States Patent Office 2,925,323
Patented Feb. 16, 1960

2,925,323
METHOD FOR THE RECOVERY OF CESIUM VALUES

Stanley J. Rimshaw, Loudon, Tenn., assignor to the United States of America as represented by the United States Atomic Energy Commission No Drawing. Application December 5, 1955
Serial No. 551,186

11 Claims. (Cl. 23—25)

My invention relates to a process for the recovery of cesium from an aqueous solution containing extraneous impurities, and more particularly to a process for the recovery of cesium-137 from an aqueous solution containing same together with nuclear fission products.

Cesium-137 is formed by the fission of uranium or plutonium, usually in a neutronic reactor, and is found in the following decay chain:

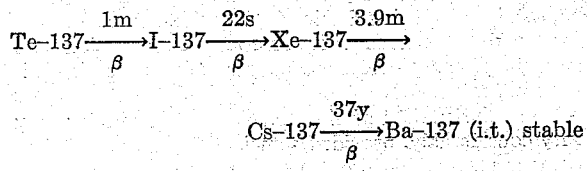

Cesium-137 emits a 0.52-mev. beta particle which is essentially in equilibrium with a 0.66-mev. gamma formed by the internal transition of Ba-137 with a half-life of 158 sec. Cesium-137 is considered to be one of the most useful gamma-producing fission products. A kilocurie cesium teletherapy unit has recently been constructed, and cesium shows promise of extensive use for tumor treatment. In the new fission product separation plant at the Oak Ridge National Laboratory, approximately 200,000 curies per year of cesium will be separated by my invention. Recent economic studies have also been made which indicate that cesium-137 would be attractive for use in large megacurie or multi-megacurie installations for the irradiation of food, drugs and the like.

The usual source material for the recovery of cesium-137 is an aqueous radioactive waste solution obtained in the chemical processing of spent, irradiated uranium reactor fuel by solvent extraction means with an organic extractant. Such processes generally comprise contacting an aqueous acidic solution of neutron-irradiated uranium with a selective organic extractant, like tributyl phosphate in a hydrocarbon diluent, which results in the selective extraction of the uranium into the organic phase, while confining the fission products to the aqueous phase. The resulting aqueous waste solution from the first extraction column becomes the source material for the cesium recovery. For more details concerning solvent extraction processes for the decontamination of uranium from fission products, reference is made to a paper, and to the references therein, delivered by F. L. Culler at the Geneva International Conference On The Peaceful Uses Of Atomic Energy in August 1955, entitled "Reprocessing of Reactor Fuel And Blanket Materials By Solvent Extraction," which is available for sale by the United Nations Bookshop, United Nations, New York, N.Y., and has the reference number UN–822.

A method for the concentration of cesium-137 from aqueous radioactive solutions is proposed by A. T. Gresky in AECD–2999, published October 12, 1950, by the Technical Information Division of the Atomic Energy Commission, Oak Ridge, Tennessee, entitled "Recovery of Cesium-137 from ORNL Radiochemical Waste." This paper shows that cesium-137 may be scavenged from waste solutions with potassium alum. Gresky does not show the actual recovery of cesium from the potassium alum precipitate, however, although he suggests that this might be done by adsorption of cesium from a solution of the alum on Dowex-50 resin, a cation exchange resin, followed by chromatographic elution to separate it from potassium. The process suggested in this paper was found to have a number of severe drawbacks, which prevented its use on a large scale. For example, while alkali metals may be separated from each other by cation exchange means, it was found that cesium and potassium were only partially separated. Also, the cation exchange resin was subjected to severe nuclear irradiation, resulting in its decomposition and decrease of exchange properties with high product losses. As a result of these problems, carrier and contaminant-free cesium-137 has not yet been obtainable by a separation process amenable to economical, practical, large-scale plant operation.

An object of my invention, therefore, is to provide an improved method for the recovery of cesium from an aqueous solution containing same together with extraneous impurities.

Another object of my invention is to provide an improved method for the recovery of cesium from an aqueous solution containing same together with radioactive impurities.

Another object is to provide a method for the recovery of cesium-137 from an aqueous solution containing same together with other nuclear fission products, wherein separation from alkali metals and other contaminants is complete.

Still another object is to provide such a method employing ion exchange means, wherein the resin is not subjected to intolerable radiation levels.

Yet another object is to provide such a process which is relatively simple, easy to perform, and amenable to practical and economical large scale operation.

Other objects and advantages of my invention will become apparent from the following detailed description and the claims appended hereto.

In accordance with my present invention, I have provided a method for the recovery of cesium from an aqueous solution containing same together with extraneous impurities, which comprises precipitating ammonium alum in said solution, separating the resulting cesium-containing alum precipitate from the resulting supernatant solution, dissolving the separated precipitate in an aqueous medium, selectively removing aluminum from the resulting aqueous solution as the hydroxide, contacting the resulting, aluminum-free solution with an anion exchange resin bed, collecting the resulting unadsorbed, cesium and ammonium-containing effluent from the resulting anion impurities-containing resin bed, and separating said cesium from said ammonium in the collected effluent.

The practice of my invention achieves high recoveries of cesium-137 with excellent purification. The ammonium alum is a highly specific carrier for cesium, and its use is critical for the success of my invention. The precipitation of the aluminum as the hydroxide prevents its possible precipitation in the resin bed, which would block fluid passage and increase radiation damage. The resin removes any contaminating anions, such as sulfate ion, or any of the other fission products in anionic form.

The anion exchange resin does not adsorb cesium, thus obviating the need for a separate careful chromatographic elution step, and eliminates radiation damage problems which would arise with cesium residence on the resin. The cesium and ammonium are easily separable by distillation of ammonia, any residual traces of ammonium ion being removed by treatment with strong mineral acid, such as hydrochloric and nitric acids and aqua regia.

The term "fission" is used herein in its generally accepted meaning as referring to the splitting of a heavy element, especially an actinide element, into two more or less equal parts upon the capture of a neutron of appropriate energy, and the term "fission products" refers to the immediate product nuclei from fission as well as to their radioactive decay products. (See Glasstone, Principles of Nuclear Engineering, Van Nostrand Company, especially pages 105–128.) For practical purposes, the fission products of uranium and plutonium are of principal interest. The closely similar statistical fission product yields of U–233, U–235 and Pu–239 are shown by Stevenson, Introduction To Nuclear Engineering, McGraw-Hill, page 50.

My invention may be successfully practiced on aqueous fission product solutions of considerably varying spectra and prior processing history, containing also non-radioactive constituents such as process additives and corrosion products, and the employment of a particular fission product solution is not at all critical. Examples of fission product solutions, from which cesium–137 may be recovered in excellent yield and purity, are shown in the following tables. The solution of Table I is a waste solution from a bismuth phosphate precipitation process for uranium and plutonium recovery, that of Table II is a general mixed waste from the Oak Ridge National Laboratory tank farm, and that of Table III is the aqueous waste from the extraction column in a solvent extraction process for the decontamination of thorium and uranium–233 from neutron irradiated thorium. For still further examples of suitable fission product solutions, reference is made to the previously mentioned paper and to Patent No. 2,766,204, issued October 9, 1956.

TABLE I

*Bismuth phosphate waste*

| Constituent | Concentration, grams/liter | Activity (Counts/Min./Ml.) |
|---|---|---|
| Total solids | 152.9 | |
| Phosphates | 10.3 | |
| Carbonates | 36.0 | |
| Sulfates | 14.3 | |
| Nitrates | 33.4 | |
| Hydroxide | 59.0 | |
| Uranium | 0.25 | |
| Total beta-gamma | | $1.16 \times 10^6$ |
| Cesium beta | | $0.82 \times 10^6$ |
| Ru beta | | $0.26 \times 10^6$ |
| Other betas | | $0.07 \times 10^6$ |

Specific Gravity—1.15.
pH—13–14.

TABLE II

*Mixed wastes*

| Constituent | Activity (Counts/Min./Ml.) | Millicuries/Liter |
|---|---|---|
| Gross beta | $1.41 \times 10^7$ | 63.5. |
| Cs beta | $1.65 \times 10^6$ | 7.43. |
| Ru beta | $1.78 \times 10^5$ | 0.80. |
| Sr beta | $7.78 \times 10^5$ | 3.5. |
| Total Rare Earths+Ce | $2.08 \times 10^6$ | 9.37. |
| Total solids | 80.5 mg./ml. | 80.5 grams/liter. |
| Non-volatile matter | 35.0 mg./ml. | 35.0 grams/liter. |

TABLE III

*Thorium solvent extraction waste*

| Constituent | Concentration | Activity (Counts/Min./Ml.) |
|---|---|---|
| Al | 0.611 M | |
| Tributyl phosphate | 0.25 g./liter | |
| Th-232 | <0.01 g./liter | |
| Th-234 beta | | 10 |
| U | ~$10^{-5}$ g./liter | |
| U-233 alpha | | <100 |
| F- | 0.0375 M | |
| Hg++ | 0.0015 M | |
| Be | 0.043 M | |
| Gross gamma | | $10^7$ |
| Gross beta | | $10^{10}$ |
| Pa beta | | $10^{10}$ |
| Total Rare Earths | | $10^8$ |
| Ru beta | | $10^6$ |
| Zr beta | | $4 \times 10^6$ |
| Nb beta | | $10^7$ |

As the first step in my process, ammonium alum $[(NH_4)_2SO_4 \cdot Al_2(SO_4)_3 \cdot 24H_2O]$ is precipitated in the waste solution. For this precipitation, the radioactive waste solution, which is commonly made alkaline for storage, should be made acidic (aluminum will not precipitate in basic solution, soluble aluminates being formed). The solution may be made strongly acid, say about 2–3 normal in the acid, or may be as weakly acidic as about pH 4.5, but a concentration of about 0.5 normal in free acid is preferred. Any mineral acid, such as nitric or hydrochloric acid, is suitable for the acidification, but sulfuric acid is preferred as it possesses a common ion with the alum which provides some mass action effect for efficient crystallization.

While the amount of alum precipitated in solution may vary considerably, provided sufficient reagent is added to exceed the solubility product of ammonium alum (about 125 grams/liter at 25° C.), I find that about 200–400 grams per liter is quite suitable, and about 240 grams per liter is preferred. For any succeeding crystallizations only the replacement of the ammonium alum lost due to solubility is required. As many waste solutions from which the cesium is to be separated contain an appreciable amount of aluminum (aluminum is employed as a salting agent in a number of the above referenced solvent extraction processes and it is also frequently used as a jacket for uranium fuel elements in a neutronic reactor), this aluminum can be utilized by forming the ammonium alum in situ. Thus, aluminum sulfate $[Al_2(SO_4)_3 \cdot H_2O]$ and ammonium sulfate $[(NH_4)_2SO_4]$ may be added separately, the stoichiometry of the additions being adjusted to account for the aluminum present in solution.

The initial dissolution of the alum or the in situ formation thereof is best performed in warm solution to obtain maximum dissolution, say between 30°–95° C., about 90° C. (just below boiling) being optimum. Then, on cooling, crystallization of the alum begins. While the crystallization temperature is not critical, greater crystal yields are obtainable at lower temperatures, so 20° C. is satisfactory, and about 4° C. is preferred. Further concentration of the cesium and decontamination from impurities, especially any rubidium, may be obtained by separating the alum precipitate from the supernatant solution, redissolving the precipitate in water and recrystallizing. The supernatant from each recrystallization may be recycled to the original feed solution. About two recrystallizations appear to be optimum.

After the product alum from the last recrystallization is dissolved in water, then aluminum may be selectively removed to prevent later possible precipitation of aluminum in the resin bed, which might block fluid passage. While such precipitation may be accomplished in various manners, such as by the direct addition of ammonium-hydroxide, I find that two very satisfactory methods are by the decomposition of urea in solution and by the direct introduction of ammonia gas into solution. In the urea method, approximately 30 grams of urea per liter are added to the solution, when beginning with a solution 0.5 N in free acid, and the solution boiled for approximately 2 hours, causing the urea to decompose with a resulting rise of pH to approximately pH 4.5–7.5 and the formation of aluminum hydroxide. With solutions of other initial acidities, the quantity of urea added is adjusted to yield the desired pH. Generally, I prefer to employ gaseous ammonia, wherein same is passed into the solution until precipitation is complete. The particular method chosen for aluminum removal fortunately does not affect cesium recovery.

Upon the removal of aluminum from solution, the resulting solution may then be passed through a bed of a comminuted anion exchange resin. Generally suitable anion exchanger resins are polyvinyl benzene polymers characterized by a plurality of amine linkages as the active exchange groups. The structure of an anion exchange resin of this character suitable for use in my invention is shown by Nachod, Ion Exchange, page 62. The structure of another suitable anion exchange resin having suitable amine linkages is shown by Walton, Principles and Methods of Chemical Analyses, page 132. Weak base anion exchangers, that is resins having primary, secondary or tertiary amine structures, may be satisfactorily employed in my invention. For purposes of ready availability, reference is made to the following trade-named weak base anion exchangers: Amberlite IR–4B, Duolite A–2 and De-Acidite 51S. However, I prefer to employ strong base (quaternary amine) anion exchangers, and examples of these are the following trade-named resins: Amberlite IRA–400 and 410, Dowex–1 and Permutit–S. In the ion exchange process, the anion of the active exchange group (such as chloride, hydroxide being preferred), goes into solution while the anion to be adsorbed, particularly sulfate in this case, forms a more or less loose association with the positively charged nitrogen atoms of the amine group. The size of the resin particles in the ion exchange bed may satisfactorily vary, but a mesh size of approximately 50–100 is preferred. The rate of passage of the feed solution through the bed may likewise vary, about 3–15 milliliters per minute per square centimeter being satisfactory, while about 6–10 milliliters per minute per square centimeter is optimum.

In a preferred form of my invention, an aqueous solution of uranium fission products is adjusted to an acidity of approximately 0.5 normal in sulfuric acid, approximately 240 grams/liter of ammonium alum are added to the solution while maintaining the temperature at approximately 90° C., and the solution then cooled to about 4° C. The alum crystals are harvested, dissolved in water and recrystallized twice. The crystals are then redissolved, ammonia gas passed into the solution until aluminum hydroxide is precipitated at approximately pH 4.5–7.0. The suernatant solution is passed through a bed of the hydroxyl form of an anion exchange resin of a polyvinyl benzene polymer characterized by a plurality of quaternary amine linkages at a flow rate of about 6–10 ml./min./cm.$^2$. The effluent is collected, ammonia distilled off, and the remaining cesium hydroxide solution is neutralized with hydrochloric acid, and fumed with aqua regia.

The following examples are offered to illustrate my invention in more detail.

EXAMPLE 1

The aqueous waste solution from the extraction column of the Purex Process, a tributyl phosphate solvent extraction process for the decontamination of neutron-irradiated uranium from fission products (see the previously referred to paper for details of this process) had the following composition:

TABLE I

| Constituent | Concentration | Composition of Initial Solution Activity (Counts/Min./Ml.) |
|---|---|---|
| Gross beta | | 3.05×10$^9$ |
| Total Rare Earths beta | | 1.79×10$^9$ |
| Cesium beta | | 1.3×10$^9$ |
| Sr | | 2.41×10$^8$ |
| Cs | | 3.34×10$^8$ |
| Ru | | 2.42×10$^8$ |
| Total Solids | 29.5 grams/liter | |
| Non Volatile Matter (600° C.) | 17.8 grams/liter | |
| HNO$_3$ | 4.5 N | |
| Fe | 1.5 grams/liter | |
| Gross alpha | | 2.65×10$^6$ |

About 240 grams of ammonium alum per liter were added to the first 30 gallon batch and 120 grams ammonium alum per liter were added to succeeding 30 gallon batchs of a total of 400 gallons of the above solution at a temperature of 90° C. The solution was then cooled to about 25° C. with mechanical agitation after which alum crystals were permitted to settle, and about two liters of alum crystals, having an activity of about 2,400 curies, were harvested. The estimated recovery from this single crystallization was greater than 90%. These were dissolved in 20 liters of water and transferred to a 60 liter precipitator for precipitation of aluminum with urea. The concentration of aluminum was 0.2 molar or 5.4 grams aluminum per liter. The concentration of cesium–137 was greater than 100 curies per liter of solution, and the concentration of cesium isotopes by weight was greater than 3.0 grams per liter of solution.

Sixty grams per liter of urea were added to the 20 liters of dilute alum solution and the resulting solution was simmered at 90–100° C. for three hours. About 50% of the urea decomposed to ammonia and carbon dioxide, and the aluminum precipitated as a dense, granular Al(OH)$_3$ precipitate which was easy to filter. The final pH was adjusted at pH 6.5–7.0, and the aluminum hydroxide was filtered off. The filtrate was concentrated by evaporation and removed for further purification. The precipitate was dissolved in 70% nitric acid and returned for recycle to the alum crystallizer.

The foregoing cesium concentration steps were performed on a semi-works basis in stainless steel equipment, and the cesium contained small amounts of iron, chromium and nickel corrosion products. The final purification, following, was made in glass equipment on a smaller batch basis. Approximately 3 liters of the supernatant solution from the aluminum precipitation, containing approximately 400 curies of cesium–137, were transferred by vacuum to a second, crystallizer. Sufficient aluminum sulfate and ammonium sulfate were added to result in about 500 grams of alum crystals on the first crystallization. After all the solids were dissolved at 80° C. with agitation, the temperature was lowered to 20° C. The crystals were allowed to settle and the supernatant liquids drawn off and retained for reprocessing. The recrystallization procedure was repeated two more times, which was sufficient to remove the impurities and reduce the alum crystals to about 150 grams. Cesium losses in the decanted liquid ran 25, 9 and 3 curies in the first, second and third crystallizations. Sufficient water was then added to bring the volume to 1500 milliliters and the solution agitated and heated to 80° C. Air-borne ammonia, prepared by bubbling air through 16 N ammonium hydroxide, was introduced into the solution at an air flow rate of 2 cubic feet per hour until the aluminum hydroxide precipitation was completed after 1½ hours. The filtrate from the aluminum hydroxide precipitation was a slightly alkaline solution containing cesium sulfate and ammonium sulfate. This solution was then passedt hrough a bed of Amberlite IIRA–410 anion exchange resin, 60–90 mesh, initially in the hydroxyl form, at a flow rate of 6–10 ml./min./cm.² . This removed essentially all of the sulfate ion and any anionic impurities. The column was regenerated with 10% sodium hydroxide.

The effluent from the resin column was evaporated to near dryness, which removed most of the ammonium hydroxide. The resulting cesium hydroxide solution was then neutralized with hydrochloric acid and evaporated to complete dryness. The residue was fumed with aqua regia to oxidize any organic matter and to remove last traces of ammonium ion, and was then taken to dryness to yield pure cesium chloride crystals. The product yield was approximately 95% and the purity was at least 99.9%.

EXAMPLE 2

The procedure of Example 1 was followed, except that the initial solution was approximately two years old, mixed wastes from the solvent extraction processes of the previously referred to paper. The composition of this solution is shown in the table below. The product yield was approximately 95% and the product purity exceeded 99.9%.

TABLE V

*Composition of initial solution in Example 2*

| Constituent | Concentration | Activity (Counts/Min./Ml.) |
|---|---|---|
| Gross beta | | $6.5 \times 10^9$ |
| $HNO_3$ | 3.5 N | |
| Sr | | $0.7 \times 10^8$ |
| Ru | | $0.323 \times 10^8$ |
| Fe | 0.85 gram/liter | |
| Cs | | $0.9 \times 10^8$ |
| Tc | 3.875 mg./liter | |
| Total Rare Earths | | $2.7 \times 10^9$ |

As can readily be determined from the above tables, cesium values are carried down by ammonium alum from aqueous solutions containing cesium in a wide range of concentrations below the concentration which would support the formation of an insoluble cesium alum precipitate.

The above examples are only illustrative, and should not be considered as limiting the scope of my invention. In view of the great selectivity of ammonium alum for cesium, the starting solution of fission products may be subject to considerable variation. Furthermore, the waste solutions may be first subjected to recovery processes for the separation of other radioisotopes, such as technetium, europium, rare earths, and ruthenium prior to cesium recovery. Also, it should be apparent that modifications of my invention, particularly with regard to its manipulative aspects, recrystallization and recycle schemes, may be made by those skilled in the art without departing from the spirit of my invention. Accordingly, my invention should be understood to be limited only as is indicated by the appended claims.

Having thus described my invention I claim:

1. A method for the recovery of cesium values from an aqueous solution containing said cesium values at a concentration sufficiently low to prevent the formation of an insoluble cesium alum precipitate, together with fission product values in solution, which comprises providing a sufficient concentration of sulfate, ammonium, and aluminum ions in said solution, while maintaining said solution at a pH less than approximately 4.5, to precipitate ammonium alum in said solution whereby cesium values are carried down, separating the resulting cesium containing alum precipitate from the resulting supernatant solution, dissolving the separated precipitate in an aqueous medium providing hydroxide ions in the resulting aqueous solution until a pH within the range from approximately 4.5 to approximately 7.5 is reached, whereby aluminum hydroxide is precipitated, separating the aluminum hydroxide precipitate from the resulting aluminum-free solution, contacting said aluminum-free solution with an anion exchange resin bed, collecting the resulting effluent, containing unabsorbed cesium and ammonium ions, from the resulting anion-impurity-containing resin bed, eliminating the ammonium ions from the collected effluent and recovering substantially ammonium-free cesium values from the resulting effluent.

2. The method of claim 1, wherein the hydroxide ions are incorporated in the aqueous solution of the dissolved separated alum precipitate by passing ammonia gas into said solution.

3. The method of claim 1 wherein the hydroxide ions are incorporated in the aqueous solution of the dissolved separated alum precipitate by adding urea to said solution and boiling the resulting solution.

4. The method of claim 1 wherein the sulfate, ammonium, and aluminum ions to precipitate ammonium alum in situ are provided by adding aluminum sulfate and ammonium sulfate to said initial aqueous solution.

5. The method of claim 1 wherein the initial aqueous solution is adjusted to an acidity of approximately 3 normal-pH 4.5, and the sulfate, ammonium, and aluminum ions to precipitate ammonium alum in situ are provided by adding aluminum sulfate and ammonium sulfate to said initial aqueous solution while maintaining said solution at a temperature of approximately 30°–90° C., and the resulting solution is cooled to initiate crystallization of said alum.

6. The method of claim 1 wherein said anion exchange resin is a polyvinyl benzene polymer characterized by a plurality of amine linkages.

7. A method for the separation of cesium values from an aqueous solution containing said cesium values at a concentration sufficiently low to prevent the formation of an insoluble cesium alum precipitate, together with uranium fission product values in solution which comprises providing a sufficient concentration of sulfate, ammonium, and aluminum ions in said solution, while maintaining said solution at a pH less than approximately 4.5, to precipitate ammonium alum in said solution whereby cesium values are carried down, separating the resulting cesium-containing alum precipitate from the resulting supernatant solution, dissolving the separated precipitate in water, providing hydroxide ions in the resulting aqueous medium until a ph within the range from approximately 4.5 to approximately 7.5 is reached, whereby aluminum hydroxide is precipitated, separating the cesium-containing supernatant solution from said aluminum precipitate, contacting the resulting separated solution with a comminuted bed of an anion exchange resin of polyvinyl benzene polymer characterized by a plurality of amine linkages, collecting the resulting effluent, containing unabsorbed cesium and ammonium ions, from said anion-impurities containing resin bed, eliminating the ammonium ions from the collected effluent and recovering substantially ammonium-free cesium values from the resulting effluent.

8. The method of claim 7 wherein said initial solution is adjusted to an acidity of approximately 0.5 normal, sulfate, ammonium and aluminum ions are provided in said solution by dissolving aluminum sulfate and ammonium sulfate in the resulting adjusted solution to yield approximately 240 grams ammonium alum per liter while maintaining said solution at a temperature of approximately 90° C., and the resulting solution is then cooled to a temperature below approximately 25° C. to initiate crystallization of ammonium alum.

9. The method of claim 8 wherein the hydroxide ions are incorporated into the aqueous medium containing the dissolved alum precipitate by introducing ammonia gas into said aqueous medium until precipitation occurs.

10. The method of claim 9 wherein said amine linkages of said anion exchange resin are of a quaternary amine structure initially in the hydroxyl form.

11. The method of claim 10 wherein said ammonium is separated from said cesium in said collected effluent from said resin bed by distillation, and any remaining ammonium is destroyed by reaction with strong aqueous mineral acid.

References Cited in the file of this patent

UNITED STATES PATENTS

| | | |
|---|---|---|
| 2,160,148 | Hunyady | May 30, 1939 |
| 2,798,050 | Gladrow et al. | July 2, 1957 |

OTHER REFERENCES

Mellor: "Comprehensive Treatise on Theoretical and Inorganic Chemistry," vol. II, 1922, pages 442 to 444.

Samuelson: "Ion Exchangers in Analytical Chemistry," 1953, pages 93, 94 and 137; published by John Wiley and Sons, New York.

Hopkins: "Chemistry of the Rarer Elements," published by D. C. Heath and Co., New York, 1923, page 52.

Gresky: A.E.C.D. 2999, Oct. 12, 1950, U.S.A.E.C., Technical Information Div., Ore, Oak Ridge, Tenn.

Industrial Engineering Chemistry, June 1942, p. 51 of advertising section.